(12) United States Patent
Nakashima et al.

(10) Patent No.: US 7,695,825 B2
(45) Date of Patent: Apr. 13, 2010

(54) CIRCULARLY WELDED JOINT FEATURING EXCELLENT FATIGUE STRENGTH, METHOD OF PRODUCING CIRCULARLY WELDED JOINT AND WELDED STRUCTURE

(75) Inventors: Kiyotaka Nakashima, Futtsu (JP); Tadashi Ishikawa, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 924 days.

(21) Appl. No.: 10/530,948

(22) PCT Filed: Oct. 8, 2003

(86) PCT No.: PCT/JP03/12916
§ 371 (c)(1),
(2), (4) Date: Feb. 24, 2006

(87) PCT Pub. No.: WO2004/033144
PCT Pub. Date: Apr. 22, 2004

(65) Prior Publication Data
US 2007/0134059 A1    Jun. 14, 2007

(30) Foreign Application Priority Data
Oct. 8, 2002    (JP)    ............................. 2002-294397

(51) Int. Cl.
*B23K 9/23*    (2006.01)
*B23K 20/10*    (2006.01)
*B32B 15/18*    (2006.01)
*C21D 7/00*    (2006.01)

(52) U.S. Cl. ...................... 428/598; 428/683; 148/529; 148/534; 148/558

(58) Field of Classification Search ....................... None
See application file for complete search history.

(56) References Cited

U.S. PATENT DOCUMENTS 3,274,033 A * 9/1966 Jacke .......................... 148/558

(Continued)

FOREIGN PATENT DOCUMENTS

JP    6-271985    9/1994

(Continued)

OTHER PUBLICATIONS

Proceedings of the 24$^{th}$ Symposium on Fatigue, pp. 157-162 (1998).

(Continued)

*Primary Examiner*—John J Zimmerman
(74) *Attorney, Agent, or Firm*—Kenyon & Kenyon LLP

(57) ABSTRACT

A circularly welded joint featuring excellent fatigue strength obtained by welding the ends of two pieces of steel plates perpendicularly together and used for the welded structures such as buildings, ships, bridges, construction machinery and off-shore structures, a method of producing the circularly welded joints and a welded structure using the circularly welded joints are provided. A circularly welded joint is obtained by welding the ends of two pieces of steel plates perpendicularly together. Between the two pieces of the steel plates, at least the steel plate on the side on which the main stress is exerted is one that suppresses the propagation of cracks due to fatigue and, preferably, one having the compressive residual stress in the surface layer of the steel plate. When the thickness of the steel plate is denoted by t, the residual stress in the direction of main stress is the compressive residual stress over a range of not smaller than t/10 or not smaller than 3 mm in the direction of plate thickness from the circularly welded surface of the steel plate.

4 Claims, 5 Drawing Sheets

U.S. PATENT DOCUMENTS

| | | | | |
|---|---|---|---|---|
| 5,634,988 | A * | 6/1997 | Kurebayashi et al. | 148/320 |
| 6,171,415 | B1 | 1/2001 | Statnikov | |
| 6,290,905 | B1 * | 9/2001 | Watanabe et al. | 420/43 |
| 2001/0038001 | A1 * | 11/2001 | Morikage et al. | 219/137 WM |
| 2004/0244882 | A1 * | 12/2004 | Lobanov et al. | 148/558 |
| 2005/0230010 | A1 * | 10/2005 | Tominaga et al. | 148/508 |
| 2005/0252888 | A1 * | 11/2005 | Ohta et al. | 219/74 |
| 2007/0000968 | A1 * | 1/2007 | Ishikawa et al. | 228/101 |

FOREIGN PATENT DOCUMENTS

| | | | |
|---|---|---|---|
| JP | 7-90478 | | 4/1995 |
| JP | 8-118012 | * | 5/1996 |
| JP | 8-225882 | | 9/1996 |
| JP | 08-333632 | | 12/1996 |
| JP | 11-1742 | | 1/1999 |
| JP | 11-310846 | | 11/1999 |
| JP | 2000-158127 | * | 6/2000 |
| JP | 2002-129281 | | 5/2002 |
| JP | 2003-001476 | | 1/2003 |
| JP | 2003-001477 | | 1/2003 |
| JP | 2003-290972 | * | 10/2003 |

OTHER PUBLICATIONS

International Search Report, issued in corresponding International Application No. PCT/JP2003/012916.

* cited by examiner

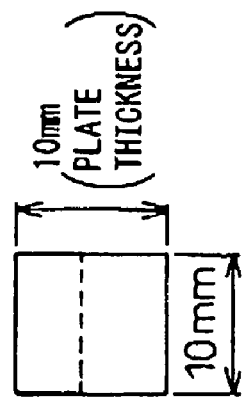
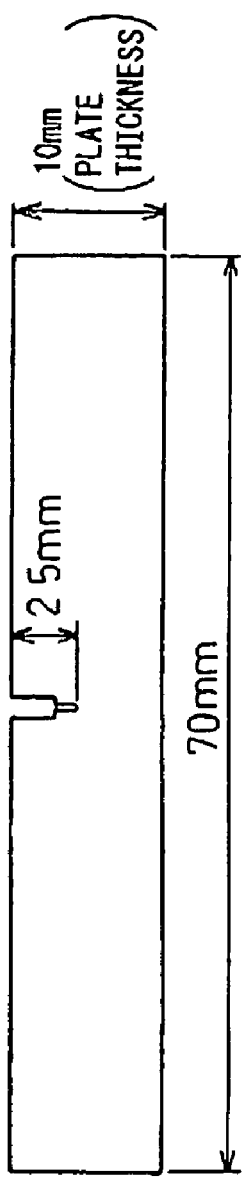
Fig.7(a)
Fig.7(b)

CIRCULARLY WELDED JOINT FEATURING EXCELLENT FATIGUE STRENGTH, METHOD OF PRODUCING CIRCULARLY WELDED JOINT AND WELDED STRUCTURE

TECHNICAL FIELD

The present invention relates to a circularly welded joint featuring excellent fatigue strength used for the welded structures such as buildings, ships, bridges, construction machinery and off-shore structures, to a method of producing the circularly welded joints and a welded structure using the circularly welded joints.

Concretely, the invention relates to a circularly welded joint featuring excellent fatigue strength obtained by welding ends of two pieces of steel plates that are perpendicularly combined together, to a method of producing the circularly welded joints and to a welded structure using the circularly welded joints.

BACKGROUND ART

Generally, a circularly welded joint obtained by welding the ends of two pieces of steel plates perpendicularly combined together has been much used as a welded joint for buildings, ships, bridges, construction machinery and off-shore structures, and a variety of welding methods have also been employed, such as arc welding, plasma welding, laser welding, electron beam welding and the like.

The circularly welded joint receives repetitive load due to wind, waves and mechanical vibration, and it is very important to improve its fatigue strength. As methods of improving the shapes of the welded beads and the fatigue strength by the treatment after the welding, there have been employed (1) grinding, (2) TIG dressing, (3) shot peening and (4) hammer peening accompanied, however, by the problems described below.

Here, the grinding and the TIG dressing are for improving the shapes of the welded beads, both of which, however, are very inefficient.

Shot peening and the hammer peening are effective in improving the fatigue strength. However, shot peening requires a huge machine as well as various utilities.

Further, hammer peening is accompanied by a large reaction and poor stability in the result of treatment often causing the press formability and the fatigue strength to be rather decreased. Further, hammer peening gives too great a plastic deformation and cannot be favorably applied to thin plates.

Moreover, grinding and hammer peening subject the joint to machining at a frequency as low as several hertz. Therefore, the machined surface becomes very rough. If stress concentrates in the mountain portions and if a load is repetitively exerted on the joint, cracks develop in the portion where stress is concentrated resulting in a decrease in the fatigue strength of the joint as a whole.

Generally, further, residual stress is introduced into the welded portion due to the heat input of welding. The residual stress is one of the factors that decrease the fatigue strength in the welded portion. As another means for improving the fatigue strength, therefore, there has been known a method of increasing the fatigue strength by producing compressive residual stress in the welded joint or by decreasing the tensile residual stress that is generated in the welded joint.

For example, compressive residual stress can be imparted by effecting the shot peening near the welded end. Here, the shot peening is a method of imparting the compressive residual stress by striking a number of steel balls of sizes of not larger than 1 mm onto a portion where cracks occur due to fatigue.

It has further been known that the shape of the welded end can be improved or the tensile residual stress can be decreased by heating and melting again the welded metal.

However, the shot peening requires steel balls posing problems of after treatment with steel balls and cost. There, further, exists a problem of dispersion in the margin for improving the fatigue strength.

As described above, the conventional technology for improving the fatigue strength cannot be employed for the circularly welded joint. Even if it could be employed, the margin of improving the fatigue strength is confined to a low level.

As prior art related to a method of improving the fatigue strength by applying ultrasonic oscillation to the welded joint, for example, U.S. Pat. No. 6,171,415 discloses a method of applying ultrasonic oscillation along the weld-seamed portion heated by the arcing of welding.

According to this prior art, however, it is a prerequisite to impart ultrasonic oscillation to a material heated at a high temperature immediately after welding and, besides, there has been disclosed no concrete range for impact with ultrasonic oscillator.

In order to improve the fatigue strength of the welded structure, further, there have been developed steel plates for suppressing the propagation of cracks due to fatigue and a variety of proposals have heretofore been made.

For example, according to the 24th Proceedings of the Fatigue Symposium, "Fatigue Properties of the Surface Layer Ultra-Fine Granulated Steel Plate", Japanese Academy of Materials, 1998, pp. 157-162, there has been disclosed that a so-called SUF steel forming an ultra-fine microstructure in the surface layer by working ferrite in a step of elevating the temperature of a steel material for general shipbuilding in the column of the kind of steel a in Table 1, exhibits the effect of delaying the propagation rate of cracks due to fatigue.

Further, JP-A-6-271985 discloses a steel plate which lowers the rate of propagation of cracks due to fatigue by effecting water-cooling after the two-phase zone rolling for lowering the finish rolling temperature of a steel plate which contains components shown in the column of the kind of steel b in Table 1, so that there forms Martensite-Austenite constituent in which the cracks, due to fatigue, undergo branching, making it possible to lower the propagation rate of cracks due to fatigue.

Further, JP-A-11-1742 discloses a steel plate for suppressing the propagation of cracks by controlling the form of the second phase in a composite microstructure comprising ferrite and second phase in a steel plate which contains components shown in the column of the kind of steel c in Table 1, and controlling the hardness of the ferrite and of the second phase, so that there occurs fine cracks from the main cracks in the second phase, which work to disperse and weaken the propagation of cracks.

JP-A-7-90478 discloses a steel plate which suppresses the propagation of cracks by rolling the steel plate which contains components shown in the column of the kind of steel d in Table 1 in the non-recrystallized zone, followed by slow cooling to form a γ-zone in which carbon is concentrated and, thereafter, effecting the quick cooling to control the formation of Martensite-Austenite constituent.

Further, JP-A-2002-129181 discloses a steel plate which suppresses the propagation of cracks due to fatigue by dispersing ferrite and second phase that has a strength greatly different from that of the ferrite so as to exist in suitable sizes and in suitable amounts in a steel plate which contains components shown in the column of the kind of steel e in Table 1 and, further, enabling a particular set microstructure to develop concurrently.

Further, JP-A-8-225882 discloses a steel plate which delays the rate of crack propagation by forming a steel plate containing components shown in the column of the kind of steel f in Table 1 and having a two-phase microstructure of ferrite and bainite, and by specifying the ratio of the ferrite phase portion, hardness of the ferrite, and number of phase boundaries between ferrite and bainite to lie within predetermined ranges.

Moreover, JP-A-11-310846 discloses a steel plate which renders the cracks, due to fatigue, to become stagnant by forming a steel plate containing components shown in the column of the kind of steel g in Table 1 and having a two-phase microstructure of ferrite and bentonite or a three-phase texture of ferrite, bainite and martensite, wherein, when a difference in the hardness between the microstructures among the composite microstructures is set to be greater than a predetermined value or when an average particle size of a soft portion or an average gap in a hard portion is suppressed to be smaller than a predetermined value in addition to the above, the plastic deformation is suppressed at the end portion in case the crack that is developing has arrived at the vicinity of the boundary between the hard portion and the soft portion.

However, even the above steel plates that suppress the propagation of cracks, due to fatigue, exhibit little effect for improving the fatigue strength in the presence of the tensile residual stress due to the heat input of the circularly welding.

That is, the stress concentrates at the welded end, and the concentration of stress is promoted if the tensile residual stress works on the end portion due to the heat input at the time of welding, causing a decrease in the fatigue strength to a conspicuous degree.

DISCLOSURE OF THE INVENTION

It is an object of the present invention to provide a circularly welded joint featuring excellent fatigue strength obtained by welding the ends of two pieces of steel plates perpendicularly together and used for the welded structures such as buildings, ships, bridges, construction machinery and off-shore structures by solving the above-mentioned problems inherent in the prior art, to a method of producing the circularly welded joint and a welded structure using the circularly welded joints.

In order to solve the above-mentioned problem, the present invention was accomplished through keen study and is as described below.

(1) A circularly welded joint featuring excellent fatigue strength properties obtained by welding the ends of two pieces of steel plates perpendicularly together wherein, between the two pieces of steel plates, at least the steel plate on the side on which the main stress is exerted is the one that suppresses the propagation of cracks due to fatigue and, when the thickness of the steel plate is denoted by t, the residual stress in the direction of main stress is the compressive residual stress over a range of not smaller than t/10 or not smaller than 3 mm in the direction of plate thickness from the circularly welded surface of the steel plate.

(2) A circularly welded joint featuring excellent fatigue strength as described in (1) above, wherein the steel plate that suppresses the propagation of cracks due to fatigue is the one having compressive residual stress in the surface layer of the steel plate.

(3) A method of producing a circularly welded joint featuring excellent fatigue strength described in (1) or (2) above, wherein a range within 5 mm from the end portion of the circularly welded joint is impacted with an ultrasonic oscillation terminal.

(4) A welded structure featuring excellent fatigue strength using the circularly welded joint described in (1) or (2) above.

BRIEF DESCRIPTION OF THE DRAWINGS

FIG. 7(a) is a front view illustrating a test piece used for the propagation testing of cracks due to fatigue;

FIG. 7(b) is a side view illustrating the test piece used for the propagation testing of cracks due to fatigue.

BEST MODE FOR CARRYING OUT THE INVENTION

An embodiment of the invention will now be described in detail with reference to FIGS. 1(a) to 4.

Figure 1A:
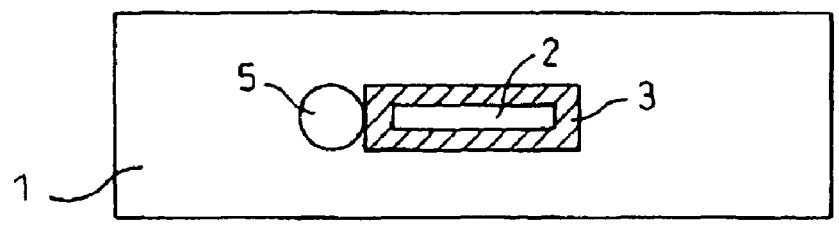
FIG. 1(a) is a plan view illustrating an embodiment of a circularly welded joint according to the present invention.
Figure 1B:
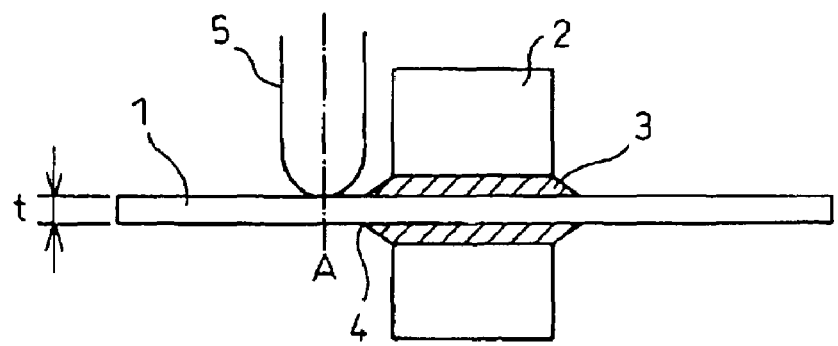
FIG. 1(b) is a front view illustrating the embodiment of the circularly welded joint according to the present invention.

FIGS. 1(a) and 1(b) are views illustrating an embodiment of the circularly welded joint according to the present invention.

In FIGS. 1(a) and 1(b), a steel plate 1 that receives the main stress and a steel plate 2 that does not receive the main stress are perpendicularly together, and are welded together at the surrounding circularly welded portion 3.

The steel 1 plate is used as a strengthening member for the welded structure while the steel plate 2 is used for a purpose other than the strengthening member.

The steel plate 1 of the side which receives main stress is at least the one that suppresses the propagation of cracks due to fatigue. This is because, cracks due to fatigue through the repetition of stress cause a problem in this member.

Here, the steel plate that suppresses the propagation of cracks due to fatigue stands for the above-mentioned SUF steel having a very fine microstructure in the surface layer and a steel plate that suppresses the propagation of cracks due to fatigue by controlling the two-phase zone rolling and the microstructure.

The mechanism for suppressing the propagation of cracks due to fatigue has been considered to be as described below.

First, cracks become stagnant due to the hard phase formed in the soft phase, and start branching so as to detour around the hard phase. Accompanying the detour and the branching of the cracks, the closure effect is promoted to suppress the cracks, and the rate of propagation of cracks becomes ⅒ to ¼ that of the general steel plates.

In the presence of the tensile residual stress, however, the closure effect decreases, and the rate of propagation of cracks becomes ⅓ to ½ that of general steel plates.

It is therefore desired that the steel plate for suppressing the propagation of cracks due to fatigue is the one that has the compressive residual stress in the surface layer of the steel plate.

If there is the compressive residual stress in the surface layer of the steel plate, the tensile residual stress due to the heat input at the time of welding can be relaxed. Besides, when the ultrasonic impact treatment is effected, the stress can be transformed into the compressive residual stress over a range of from the surface of the steel plate deep into the plate in the direction of thickness of the plate, and the fatigue strength can be improved to a remarkable degree.

When the circularly welding is effected, tensile residual stress is generated at the end portion 4 due to the heat input of welding. By impacting the periphery of the end portion within a range of 5 mm from the end portion 4 by using an ultrasonic oscillation terminal 5, therefore, the tensile residual stress can be replaced by compressive residual stress and, hence, the concentration of stress at the welded end portion can be relaxed to extend the life before the cracks occur. By using the steel plate that suppresses the propagation of cracks due to fatigue, therefore, the rate of propagation of cracks due to fatigue can be decreased down to be ¹⁄₂₀ to ⅛ that of the general steel plates owing to the increased closure effect.

The range is confined to be not larger than 5 mm. This is because, the stress concentrates in this range, and striking the range in excess of 5 mm does not work to relax the concentration of stress.

Further, though no limitation is posed on the kind of the ultrasonic generator used in the present invention, there can be formed impacted traces, at a depth of about several hundreds of microns, having excellent surface smoothness of impacted portions by using a power source of 500 W to 1 KW, by generating ultrasonic oscillation of 20 Hz to 60 Hz by using a transducer, and by amplifying the oscillation through a wave guide to oscillate an ultrasonic oscillation terminal, which is a pin of a diameter of 2 mm to 6 mm, with an amplitude of 30 to 40 μm.

Figure 2:
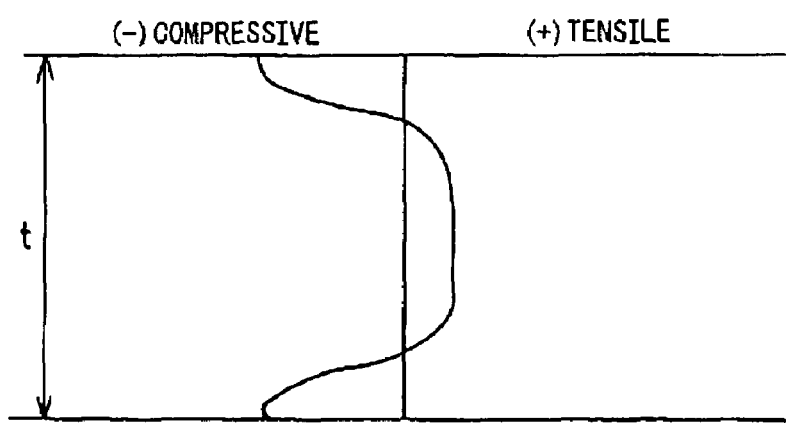
FIG. 2 is a diagram illustrating a distribution of residual stress at a point A (where the ultrasonic impact is effected) in FIG. 1(b) in the direction of the plate thickness of the steel plate 1 of prior to effecting the circularly welding.

FIG. 2 is a diagram illustrating a distribution of residual stress at a point A (where the ultrasonic impact is effected) in FIG. 1(b) in the direction of the plate thickness of the steel plate 1 of prior to effecting the circularly welding.

In FIG. 2, the direction (+) represents the tensile residual stress and the direction (−) represents the compressive residual stress.

In the step of cooling during the rolling, the cooling water is sprayed onto the surface of the steel plate 1 to quickly cool it, whereby the compressive residual stress is generated in an amount of about 50% of the yield stress in the surface layer of the steel plate as shown in FIG. 2.

Figure 3:
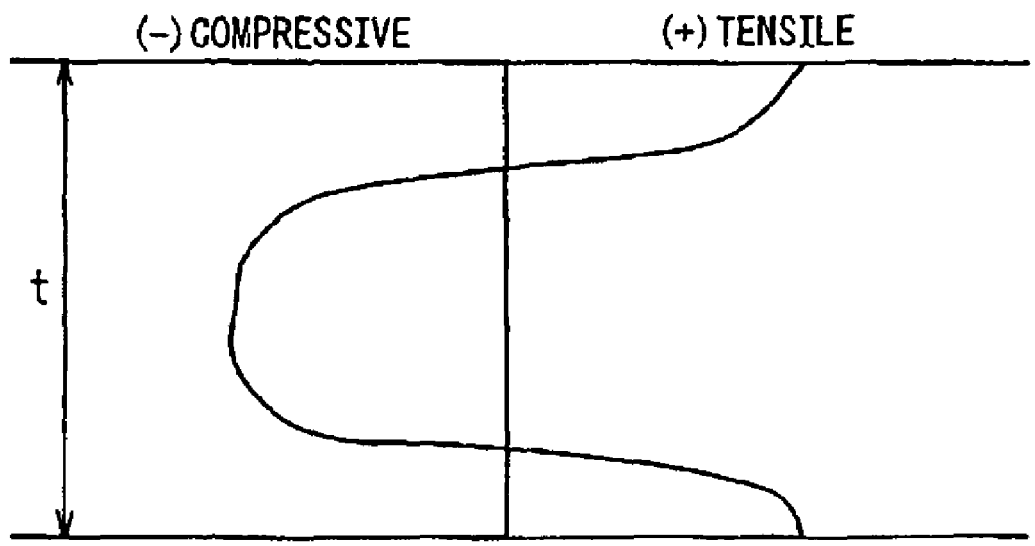
FIG. 3 is a diagram illustrating a distribution of residual stress at the point A (where the ultrasonic impact is effected) in FIG. 1(b) in the direction of the plate thickness of the steel plate 1 after having effected the circularly welding.

FIG. 3 is a diagram illustrating a distribution of residual stress at the point A (where the ultrasonic impact is effected) in FIG. 1(b) in the direction of the plate thickness of the steel plate 1 after having effected the circularly welding.

In FIG. 3, the direction (+) represents the tensile residual stress and the direction (−) represents the compressive residual stress.

Due to the heat input of the circularly welding, the tensile residual stress is generated to a degree of about 90% of the yield stress in the front and back surfaces of the steel plate. In the presence of the tensile stress, the concentration of stress is promoted at the welding end portion, and the fatigue strength decreases to a remarkable degree.

FIG. 3 illustrates a case where the steel plate 1 is circularly welded from the front and back surfaces, and the distribution is symmetrical between the front surface and the back surface.

Figure 4:
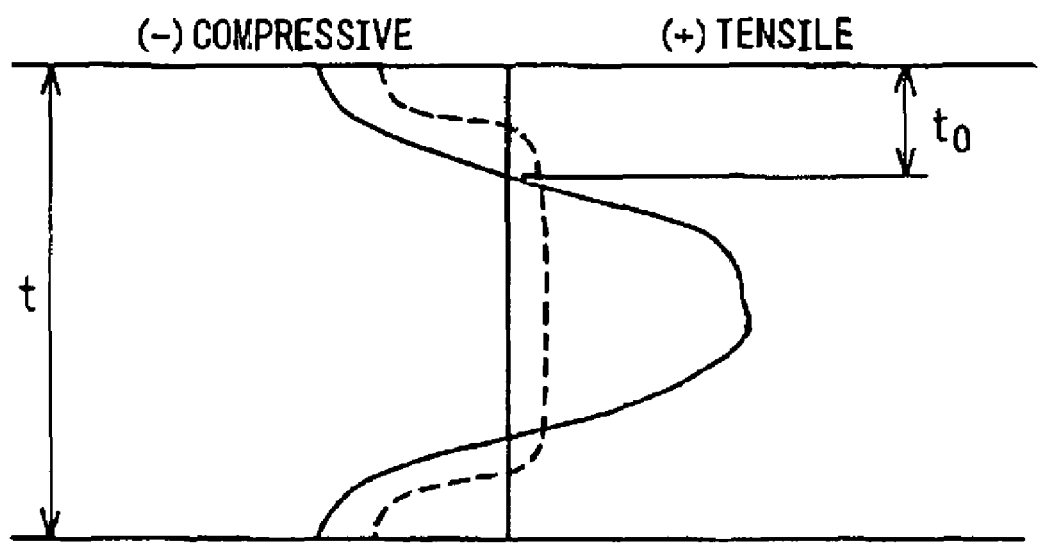
FIG. 4 is a diagram illustrating a distribution of residual stress at the point A in FIG. 1(b) in the direction of the plate thickness of the steel plate 1 after having effected the ultrasonic impact.

FIG. 4 is a diagram illustrating a distribution of residual stress at the point A in FIG. 1(b) in the direction of the plate thickness of the steel plate 1 after having effected the ultrasonic impact.

In FIG. 4, the direction (+) represents the tensile residual stress, the direction (−) represents the compressive residual stress, and $t_0$ denotes a range in which the residual stress in the direction of main stress is the compressive residual stress.

According to the present invention as shown in FIG. 4, if the thickness of the steel plate is denoted by t, the residual stress in the direction of main stress is the compressive residual stress over a range of $t_0 \geq t/8$ in the direction of plate thickness from the circularly welded surface of the steel plate. Namely, the concentration of stress at the welding end is relaxed to a large extent making it possible to greatly increase the fatigue strength.

When a generally-employed steel, which is not capable of suppressing the propagation of cracks due to fatigue, is used, on the other hand, the distribution of residual stress (dotted line) is such that the range of the compressive residual stress is in the quite surface layer in the direction of plate thickness, exhibiting a small effect for relaxing the concentration of stress at the end portion and, hence, exhibiting a small effect for increasing the fatigue strength.

Further, by constructing welded structures such as buildings, ships, bridges, construction machinery and off-shore structures by using the circularly welded joints featuring excellent fatigue strength of the present invention, it is made possible to provide welded structures featuring excellent fatigue strength.

EXAMPLES

An Example of the method of improving the fatigue strength of the-circularly welded joint of the invention will now be described with reference to Tables 2 to 4 and FIGS. 5(a) to 7(b).

FIGS. 2 and 3 show chemical composition (mass %) and production processes of the steel plate used for the example.

In FIGS. 2 and 3, the steels A to F are ordinary finished steels which do not suppress the propagation of cracks due to fatigue, and the steels G to L are propagation suppress steels for suppressing the propagation of cracks due to fatigue used in the present invention.

FIG. 4 shows the results of impacting a range within 5 mm from the end of the circularly welded joints of the steels A to L by using an ultrasonic oscillation terminal.

Figure 5A:
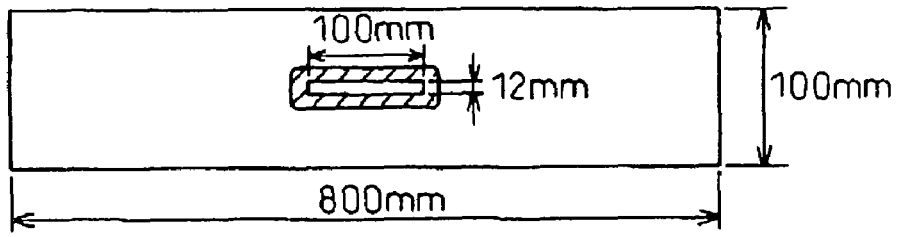
FIG. 5(a) is a plan view illustrating a circularly welded joint used in the embodiment.
Figure 5B:
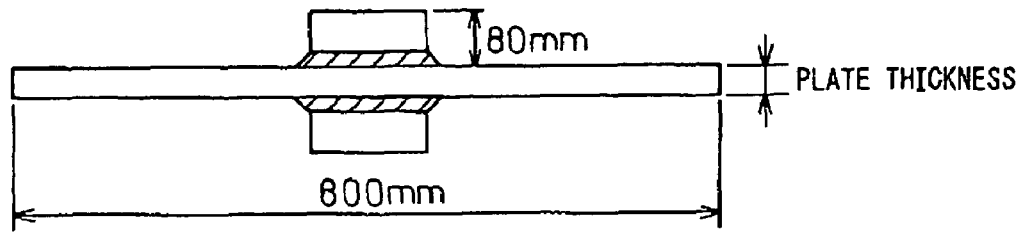
FIG. 5(b) is a front view illustrating the circularly welded joint used in the embodiment.

FIGS. 5(a) and 5(b) are diagrams illustrating the circularly welded joint used for the embodiment.

The conditions for testing the fatigue were as follows:
Load exerting system: Axial tension
Stress ratio: 0.1

Environment: At room temperature, in the air
Range of test stress: 150 MPa

Figure 6:
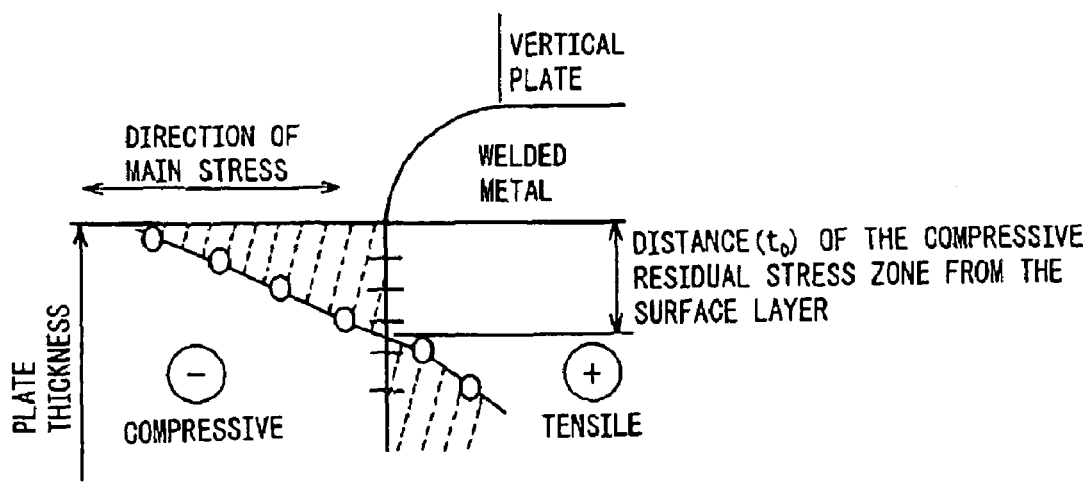
FIG. 6 is a diagram illustrating a method of measuring a distance of the compressive residual stress zone from the surface layer.

FIG. 6 is a diagram illustrating a method of measuring the distance of the compressive residual stress zone from the surface area.

The distance $t_0$ of the compressive residual stress zone from the surface layer shown in FIG. 6 was measured by an X-ray sin 2 ψ method.

Namely, after the residual stress in the surface layer was measured, the residual stress was measured after the grinding while maintaining a gap of 0.5 mm in the direction of plate thickness to find a distance to a position where the residual stress becomes zero from the surface layer.

FIGS. 7(*a*) and 7(*b*) are views illustrating a test piece used for the propagation testing of cracks due to fatigue.

The conditions for testing the propagation of cracks due to fatigue were as follows:

Load exerting system: Three point bending
Stress ratio: 0.1
Environment: At room temperature, in the air
Measurement of length of cracks: DC potential difference method FIG. 8 is a view illustrating a method of measuring the life until the cracks due to fatigue occur.

Figure 8:
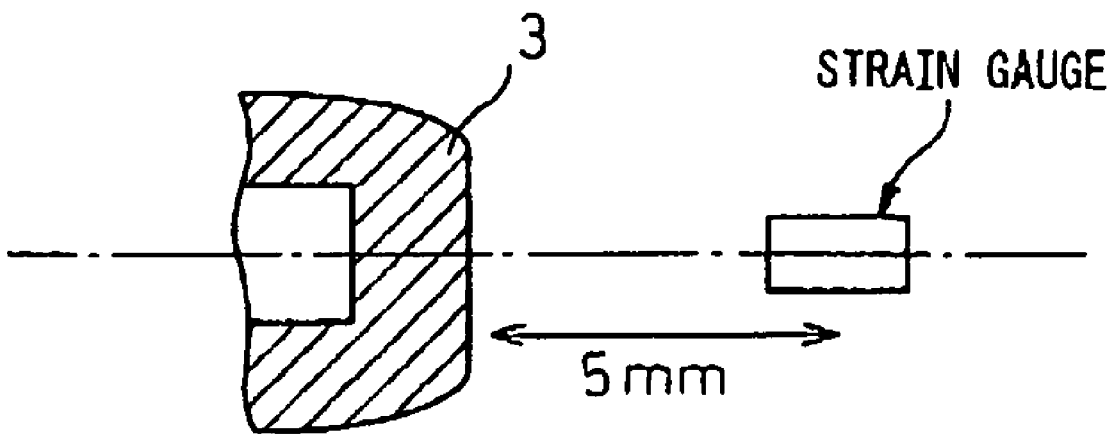
FIG. 8 is a view illustrating a method of measuring the life until cracks occur due to fatigue.

To measure the life until cracks occur in the heat-affected zone (HAZ) in FIG. 8, a strain gauge was fixed at a place 5 mm away from the end portion, and the time until the output of the strain gauge has dropped by 5% was regarded to be the occurring life.

Nos. 1, 3, 5, 7, 9 and 11 are Comparative Examples in which the ordinary finished steels were not subjected to the ultrasonic impact treatment. Therefore, the residual stress at the end portion became the tensile residual stress, and the breaking life, which is the sum of the occurring life until the cracks occur due to fatigue and the propagation life, became the shortest.

Nos. 2, 4, 6, 8, 10 and 12 are Comparative Examples in which the ordinary finished steels were subjected to the ultrasonic impact treatment. The residual stress at the end portion became the compressive residual stress. If the thickness of the steel plate is denoted by t, however, the compressive residual stress exists only within a range of not larger than t/15 in the direction of the plate thickness from the surface layer. Therefore, the breaking life, which is the sum of the occurring life until the cracks occur due to fatigue, and the propagation life were about twice as great as those when the ultrasonic impact treatment was not effected.

Nos. 13, 15, 17, 19, 21 and 23 are Comparative Examples in which the steels suppressing the propagation of cracks due to fatigue were not subjected to the ultrasonic impact treatment. Therefore, the residual stress at the end portion became the tensile residual stress. Due to the effect for suppressing the propagation of cracks due to fatigue, however, the breaking life, which is the sum of the occurring life until the cracks occur due to fatigue, and the propagation life were about twice as great as those of the ordinary finished steel.

Nos. 14, 16, 18, 20, 22 and 24 are Examples of the present invention in which the steels suppressing the propagation of cracks due to fatigue were subjected to the ultrasonic impact treatment. The residual stress at the end portion became the compressive residual stress. If the thickness of the steel plate is denoted by t, the compressive residual stress exists over a range of not smaller than t/10 or not smaller than 3 mm in the direction of the plate thickness from the surface layer. Therefore, the breaking life, which is the sum of the occurring life until the cracks occur due to fatigue and the propagation life, became not smaller than three times as great as those of the case of when the ultrasonic impact treatment was not effected.

TABLE 1

| Kind of steel | C | Si | Mn | P | S | Al | N | other components | TS(Mpa) | Remarks |
|---|---|---|---|---|---|---|---|---|---|---|
| a | 0.13 | 0.20 | 1.27 | 0.007 | 0.002 | — | — | | 526 | surface layer ultra-fine granulated steel |
| b | 0.03-0.20 | ≦0.50 | 0.4-1.6 | ≦0.020 | ≦0.010 | ≦0.10 | ≦0.06 | | 460-600 | two-phase zone rolled steel |
| c | 0.02-0.20 | ≦0.8 | 0.3-2.5 | ≦0.035 | ≦0.02 | ≦0.10 | ≦0.010 | | 350-650 | two-phase zone rolled steel |
| d | 0.02-0.20 | 0.01-1.0 | 0.3-2.0 | ≦0.01 | ≦0.010 | 0.01-0.20 | — | | 530-760 | two-phase zone rolled steel |
| e | 0.005-0.15 | 0.01-1.6 | 0.5-2.0 | ≦0.01 | ≦0.005 | ≦0.05 | — | Nb, V | 630-890 | two-phase zone rolled steel |
| f | 0.08-0.20 | 0.2-0.6 | 0.3-2.0 | ≦0.025 | ≦0.010 | 0.01-0.10 | — | Cr, Ni, Nb, Cu, | 480-680 | F + B two-phase steel |
| g | 0.01-0.30 | 0.1-0.5 | 0.3-2.0 | ≦0.025 | ≦0.010 | 0.005-0.10 | — | | 410-860 | F + M, F + B + M steel |

Note)
F: ferrite, B: bainite, M: martensite

Note)
Values in Table are all percent by mass.

TABLE 2

| Classification | Steel | C | Si | Mn | P | S | Cu | Ni | Cr | Mo | Nb | V | Ti | Al | B | N |
|---|---|---|---|---|---|---|---|---|---|---|---|---|---|---|---|---|
| Ordinary steel | A | 0.16 | 0.35 | 1.45 | 0.012 | 0.004 | — | — | — | — | — | — | — | 0.031 | — | 0.0043 |
| Ordinary steel | B | 0.16 | 0.25 | 0.95 | 0.015 | 0.005 | — | — | — | — | — | 0.04 | — | 0.033 | — | 0.0045 |
| Ordinary steel | C | 0.08 | 0.28 | 1.54 | 0.013 | 0.002 | — | — | 0.15 | 0.15 | 0.015 | — | 0.012 | 0.025 | — | 0.0042 |
| Ordinary steel | D | 0.13 | 0.34 | 1.31 | 0.018 | 0.005 | — | — | — | — | — | 0.04 | 0.011 | 0.031 | — | 0.0036 |
| Ordinary steel | E | 0.12 | 0.31 | 1.25 | 0.015 | 0.004 | — | — | — | — | — | 0.05 | — | 0.028 | — | 0.0032 |
| Ordinary steel | F | 0.18 | 0.25 | 1.15 | 0.013 | 0.003 | 0.15 | 0.15 | — | — | 0.010 | 0.02 | — | 0.024 | — | 0.0029 |
| Propagation suppress steel | G | 0.12 | 0.30 | 1.31 | 0.006 | 0.008 | — | — | — | — | 0.020 | — | 0.015 | 0.036 | — | 0.0030 |
| Propagation suppress steel | H | 0.15 | 0.20 | 1.17 | 0.005 | 0.005 | — | — | — | — | 0.010 | — | 0.012 | 0.031 | — | 0.0020 |

TABLE 2-continued

| Classification | Steel | C | Si | Mn | P | S | Cu | Ni | Cr | Mo | Nb | V | Ti | Al | B | N |
|---|---|---|---|---|---|---|---|---|---|---|---|---|---|---|---|---|
| Propagation suppress steel | I | 0.06 | 0.25 | 1.41 | 0.007 | 0.002 | 0.19 | 0.15 | — | — | — | — | 0.006 | 0.044 | 0.0008 | 0.0045 |
| Propagation suppress steel | J | 0.10 | 0.35 | 1.38 | 0.011 | 0.004 | — | — | — | — | 0.006 | — | 0.009 | 0.012 | — | 0.0042 |
| Propagation suppress steel | K | 0.08 | 0.20 | 1.35 | 0.010 | 0.005 | — | — | 0.20 | 0.20 | 0.015 | — | 0.011 | 0.028 | — | 0.0035 |
| Propagation suppress steel | L | 0.10 | 0.22 | 1.38 | 0.011 | 0.005 | — | — | — | 0.30 | — | 0.04 | 0.012 | 0.025 | — | 0.0032 |

Note)
Values in Table are all percent by mass.

TABLE 3

| Classification | Steel | Thickness of product (mm) | Thickness of slab (mm) | Heating temp. (° C.) | Rough roll start temp. (° C.) | Intermediate cooling Plate thickness at the start of cooling (mm) | Intermediate cooling Cooling rate (° C./s) | Finish roll start temp. (° C.) | Temp. at the start of cooling (° C.) | Cooling rate (° C./s) | Temp. at the end of cooling (° C.) | Reheat treatment Reheating temp. (° C.) | Reheat treatment Cooling rate (° C./s) | Tempering temp. (° C.) |
|---|---|---|---|---|---|---|---|---|---|---|---|---|---|---|
| Ordinary steel | A | 15 | 220 | 1100 | 1050 | — | — | 950 | 920 | air-cooled | <200 | — | — | — |
| Ordinary steel | B | 25 | 220 | 1050 | 1000 | — | — | 920 | 870 | air-cooled | <200 | — | — | — |
| Ordinary steel | C | 15 | 240 | 1100 | 1050 | — | — | 970 | 840 | 15 | <200 | — | — | 600 |
| Ordinary steel | D | 25 | 250 | 1150 | 1100 | — | — | 900 | 860 | 20 | <200 | — | — | 550 |
| Ordinary steel | E | 15 | 220 | 1050 | 1000 | — | — | 900 | 870 | air-cooled | <200 | 900 | air-cooled | — |
| Ordinary steel | F | 25 | 240 | 1100 | 1050 | — | — | 850 | 820 | air-cooled | <200 | 900 | air-cooled | — |
| Propagation suppress steel | G | 15 | 220 | 1150 | 1100 | 88 | 4 | 720 | 800 | 20 | 530 | — | — | — |
| Propagation suppress steel | H | 25 | 240 | 1050 | 1000 | 100 | 5 | 730 | 815 | 25 | <200 | — | — | — |
| Propagation suppress steel | I | 15 | 250 | 1100 | 1050 | — | — | 780 | 715 | 20 | 470 | — | — | — |
| Propagation suppress steel | J | 25 | 240 | 1150 | 1100 | — | — | 775 | 685 | 20 | 490 | — | — | — |
| Propagation suppress steel | K | 15 | 240 | 1100 | 1050 | — | — | 750 | 730 | 25 | <200 | — | — | — |
| Propagation suppress steel | L | 25 | 230 | 1050 | 1000 | — | — | 730 | 700 | 20 | 450 | — | — | — |

TABLE 4

| Classification | No. | Steel | Propagation rate when Δk = 20 Mpa√m (m/cycle) | Ultrasonic impact treatment | Residual stress at the end | Distance of the compressed region from the surface layer (mm) | Occurring life (cycles) | Propagation life (cycles) | Breaking life (cycles) | Ratio of breaking life to No. 1 |
|---|---|---|---|---|---|---|---|---|---|---|
| Comp. Ex. | Ordinary steel | 1 | A | 4.0E−07 | no | tensile | — | 6.00E+04 | 1.60E+05 | 2.20E+05 | 1.0 |
| Comp. Ex. | Ordinary steel | 2 |   | 4.0E−07 | yes | compressive | 0.6 | 2.70E+05 | 1.92E+05 | 4.62E+05 | 2.1 |
| Comp. Ex. | Ordinary steel | 3 | B | 4.8E−07 | no | tensile | — | 5.70E+04 | 1.57E+05 | 2.14E+05 | 1.0 |
| Comp. Ex. | Ordinary steel | 4 |   | 4.8E−07 | yes | compressive | 1.3 | 2.82E+05 | 1.95E+05 | 4.77E+05 | 2.2 |
| Comp. Ex. | Ordinary steel | 5 | C | 3.6E−07 | no | tensile | — | 6.30E+04 | 1.68E+05 | 2.31E+05 | 1.1 |
| Comp. Ex. | Ordinary steel | 6 |   | 3.6E−07 | yes | compressive | 0.7 | 2.76E+05 | 2.00E+05 | 4.76E+05 | 2.2 |
| Comp. Ex. | Ordinary steel | 7 | D | 4.0E−07 | no | tensile | — | 5.58E+04 | 1.71E+05 | 2.27E+05 | 1.0 |
| Comp. Ex. | Ordinary steel | 8 |   | 4.0E−07 | yes | compressive | 1.4 | 2.88E+05 | 1.98E+05 | 4.86E+05 | 2.2 |
| Comp. Ex. | Ordinary steel | 9 | E | 3.6E−07 | no | tensile | — | 5.70E+04 | 1.68E+05 | 2.25E+05 | 1.0 |
| Comp. Ex. | Ordinary steel | 10 |   | 3.6E−07 | yes | compressive | 0.7 | 2.74E+05 | 1.97E+05 | 4.71E+05 | 2.1 |
| Comp. Ex. | Ordinary steel | 11 | F | 4.0E−07 | no | tensile | — | 5.64E+04 | 1.70E+05 | 2.26E+05 | 1.0 |
| Comp. Ex. | Ordinary steel | 12 |   | 4.0E−07 | yes | compressive | 1.5 | 2.94E+05 | 2.05E+05 | 4.99E+05 | 2.3 |
| Comp. Ex. | Propagation suppress steel | 13 | G | 8.0E−08 | no | tensile | — | 7.20E+04 | 3.52E+05 | 4.24E+05 | 1.9 |

TABLE 4-continued

| Classification | No. | Steel | Propagation rate when Δk = 20 Mpa √m (m/cycle) | Ultrasonic impact treatment | Residual stress at the end | Distance of the compressed region from the surface layer (mm) | Occurring life (cycles) | Propagation life (cycles) | Breaking life (cycles) | Ratio of breaking life to No. 1 |
|---|---|---|---|---|---|---|---|---|---|---|
| This invention | 14 | | 8.0E−08 | yes | compressive | 1.7 | 3.00E+05 | 4.80E+05 | 7.80E+05 | 3.5 |
| Comp. Ex. | 15 | H | 6.8E−08 | no | tensile | — | 6.90E+04 | 3.68E+05 | 4.37E+05 | 2.0 |
| This invention | 16 | | 6.8E−08 | yes | compressive | 2.8 | 3.06E+05 | 4.96E+05 | 8.02E+05 | 3.6 |
| Comp. Ex. | 17 | I | 1.0E−07 | no | tensile | — | 6.60E+04 | 3.36E+05 | 4.02E+05 | 1.8 |
| This invention | 18 | | 1.0E−07 | yes | compressive | 1.8 | 2.97E+05 | 4.72E+05 | 7.69E+05 | 3.5 |
| Comp. Ex. | 19 | J | 8.0E−08 | no | tensile | — | 6.48E+04 | 3.52E+05 | 4.17E+05 | 1.9 |
| This invention | 20 | | 8.0E−08 | yes | compressive | 2.6 | 3.00E+05 | 4.88E+05 | 7.88E+05 | 3.6 |
| Comp. Ex. | 21 | K | 5.0E−08 | no | tensile | — | 7.50E+04 | 3.84E+05 | 4.59E+05 | 2.1 |
| This invention | 22 | | 5.0E−08 | yes | compressive | 1.9 | 3.12E+05 | 5.28E+05 | 8.40E+05 | 3.8 |
| Comp. Ex. | 23 | L | 4.0E−08 | no | tensile | — | 7.20E+04 | 4.16E+05 | 4.88E+05 | 2.2 |
| This invention | 24 | | 4.0E−08 | yes | compressive | 3.1 | 3.30E+05 | 5.92E+05 | 9.22E+05 | 4.2 |

Propagation suppress steel (all This invention and Comp. Ex. rows).

INDUSTRIAL APPLICABILITY

According to the present invention, there is provided a circularly welded joint, featuring excellent fatigue strength obtained by welding the ends of two pieces of steel plates perpendicularly together and used for the welded structures such as buildings, ships, bridges, construction machinery and off-shore structures, a method of producing the circularly welded joints and a welded structure using the circularly welded joints.

Concretely, the end portions of the circularly welded joint, using a steel plate which suppresses the propagation of cracks due to fatigue are subjected to the ultrasonic impact treatment to increase the breaking life of the welded joint to not smaller than three times as long as that of the conventional welded joints and, hence, to improve the reliability of the welded structures against the breakdown by fatigue, which are industrially very useful effects.

The invention claimed is:

1. A circularly welded joint, featuring excellent fatigue strength properties, obtained by welding the ends of two pieces of steel plates perpendicularly together, wherein between the two pieces of said steel plates, at least the steel plate on a side on which a main stress is exerted is a steel plate that suppresses the propagation of cracks due to fatigue and, when the thickness of said steel plate is denoted by t, the residual stress in the direction of main stress is the compressive residual stress over a range of not smaller than t/10 or not smaller than 3 mm in the direction of plate thickness from the circularly welded surface of said steel plate.

2. A circularly welded joint featuring excellent fatigue strength according to claim 1, wherein said steel plate that suppresses the propagation of cracks due to fatigue is one that has the compressive residual stress in the surface layer of said steel plate.

3. A method of producing a circularly welded joint featuring excellent fatigue strength of claim 1 or 2, wherein a range within 5 mm from the end portion of said circularly welded joint is impacted with an ultrasonic oscillation terminal.

4. A welded structure, featuring excellent fatigue strength, using the circularly welded joint of claim 1 or 2.

* * * * *